United States Patent [19]

Sakaue et al.

[11] 4,329,764
[45] May 18, 1982

[54] STEPPED COMBINATION APPARATUS

[75] Inventors: Yoshikazu Sakaue, Amagasaki; Tatsuo Mitsunaga; Toshihiro Kinoshita, both of Kobe, all of Japan

[73] Assignee: Mitsubishi Denki Kabushiki Kaisha, Tokyo, Japan

[21] Appl. No.: 252,897

[22] Filed: Apr. 10, 1981

Related U.S. Application Data

[63] Continuation of Ser. No. 962,992, Nov. 22, 1978, Pat. No. 4,304,033.

[51] Int. Cl.³ .............................................. H02K 15/04
[52] U.S. Cl. .................................. 29/33 F; 29/564.1; 29/596
[58] Field of Search ............... 29/33 F, 732, 736, 596, 29/564.1

[56] References Cited

U.S. PATENT DOCUMENTS 1,500,181 7/1924 Chapman ............................ 29/33 F
2,368,389 1/1945 Von Knaur .......................... 29/33 F
4,110,895 9/1978 Mitsui ................................ 29/736 X

FOREIGN PATENT DOCUMENTS 52-126703 10/1977 Japan .................................. 29/564.1
666614 6/1979 U.S.S.R. ................................ 29/736

Primary Examiner—William R. Briggs
Attorney, Agent, or Firm—Oblon, Fisher, Spivak, McClelland & Maier

[57] ABSTRACT

A stepped combination apparatus comprises transferring means for moving a bundle of component wires arranged in plural rows and plural lines in the longitudinal direction; pushing means for pushing the component wires to the line direction to put out a component wire at the opposite side; shifting means for shifting the component wire which is put out by the pushing means, to the other row; and stepped-bending means for stepped-bending the component wire which is put out. The operation time can be significantly shortened and a U-shape bundle of component wires can be treated by the apparatus.

4 Claims, 22 Drawing Figures

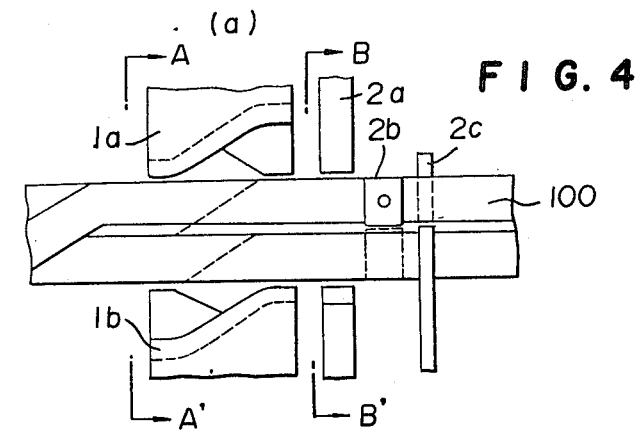
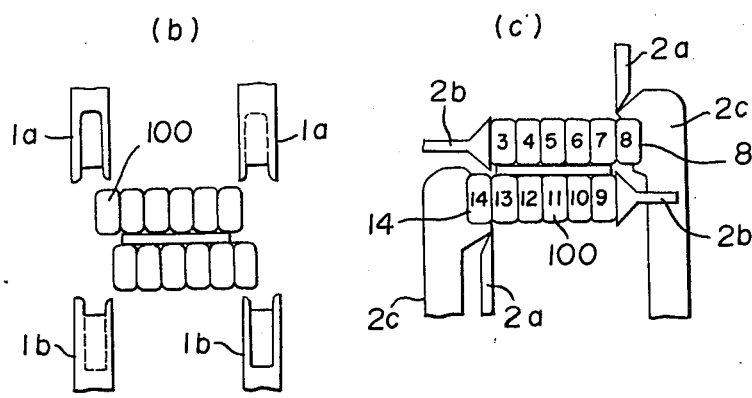
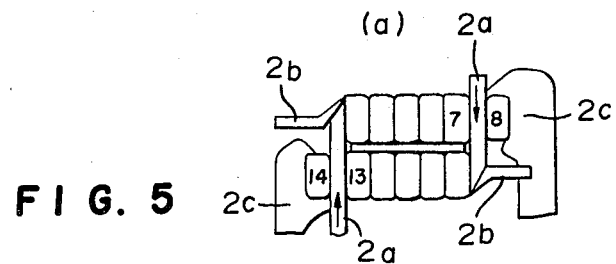
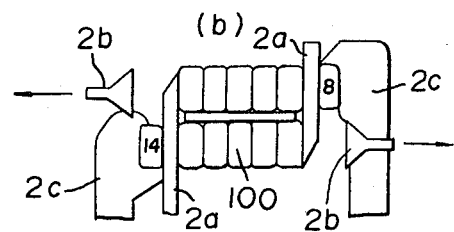
FIG. 4
FIG. 5

FIG. 6
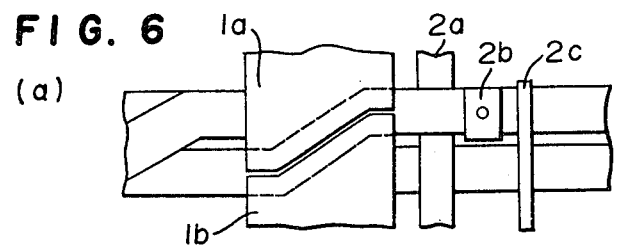
(a)
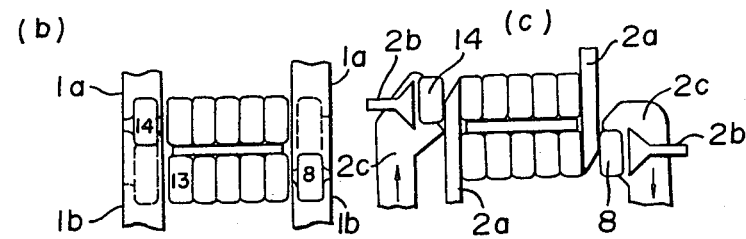
(b)  (c)
FIG. 7
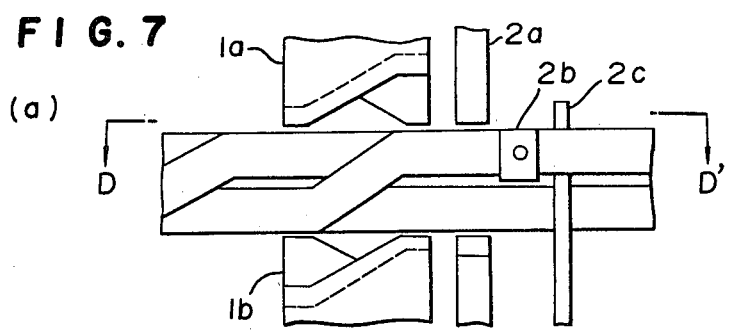
(a)
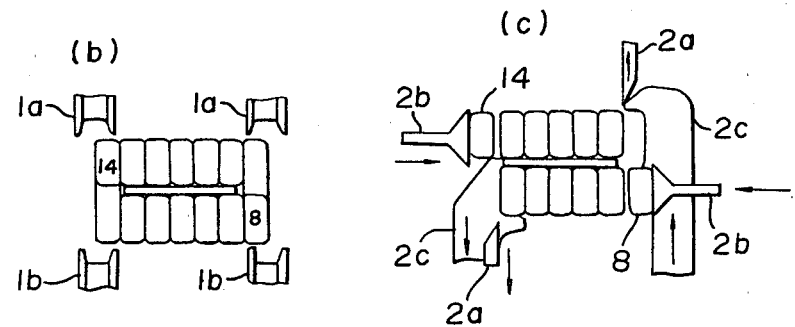
(b)  (c)

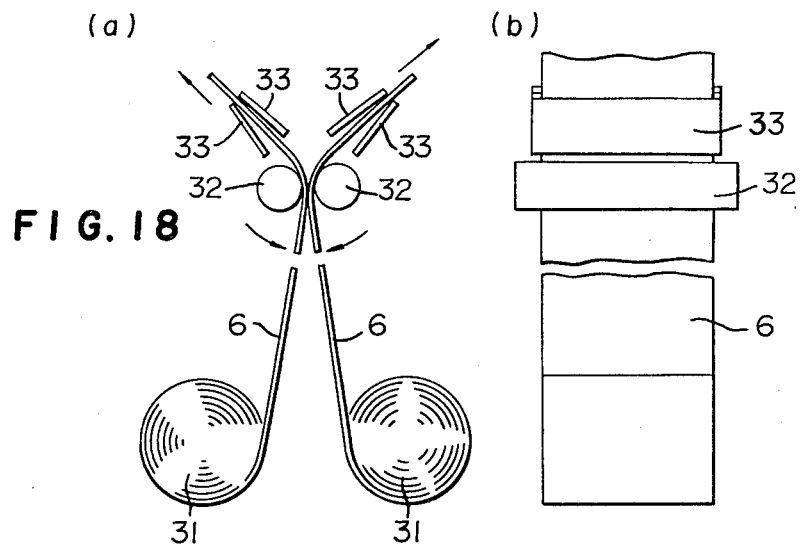
FIG. 18
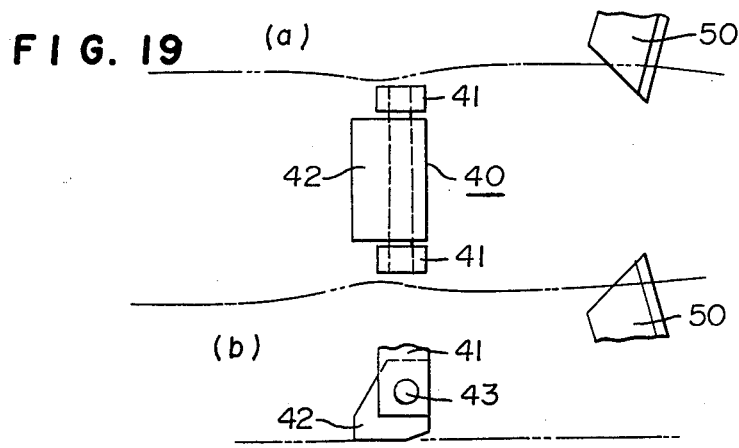
FIG. 19
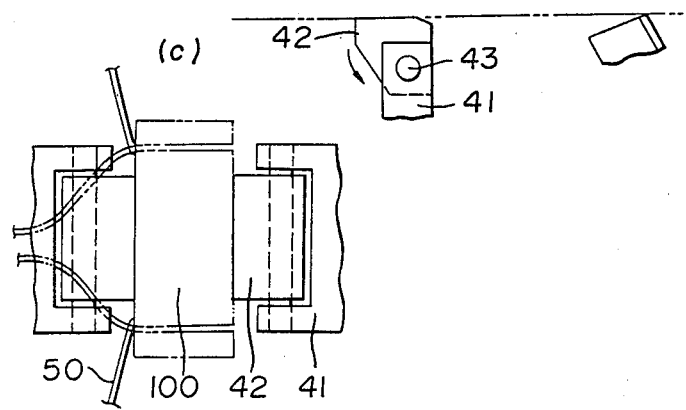

FIG. 20 (B)
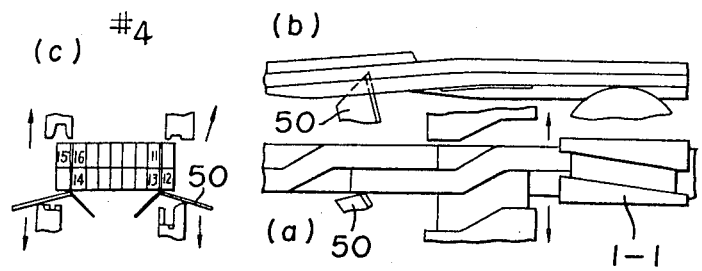
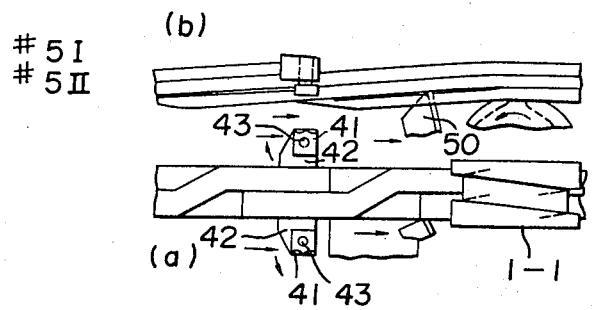
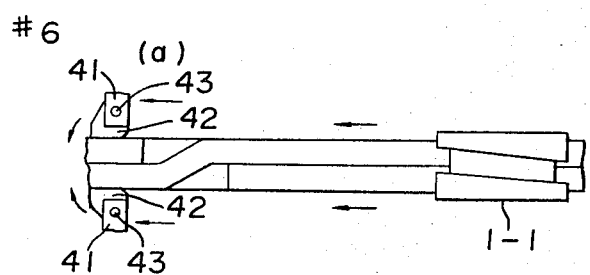

FIG. 21
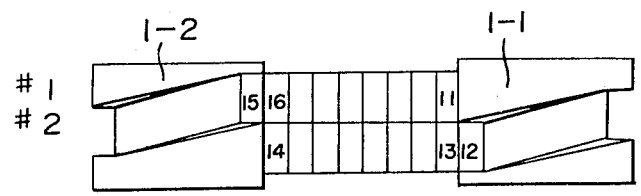
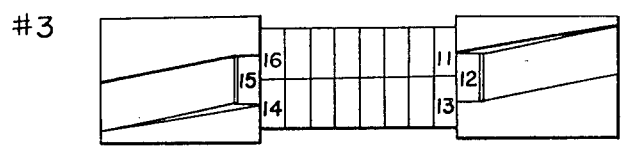
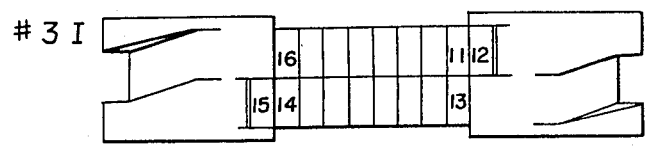
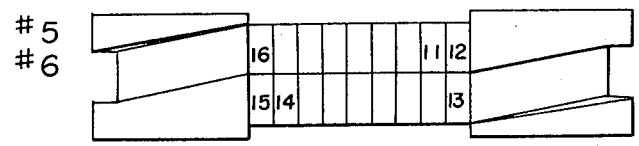

STEPPED COMBINATION APPARATUS

This is a continuation, of application Ser. No. 962,992, filed Nov. 22, 1978 now U.S. Pat. No. 4,304,033.

BACKGROUND OF THE INVENTION

1. Field of the Invention

The present invention relates to a machine tool which automatically carry out rebel shifts of stator winding of an AC machine.

2. Disclosure of the Prior Arts

It has been well-known that the stator winding of a large size synchronous machine is prepared by twisting many component wires (insulated rectangular type wires) as rebel shifting, in order to prevent a loss caused by eddy current. In many cases, the shape of the stator winding is in a diamond coil shape and the insulated diamond coil is put in each open slot of the stator.

It has been usual to rebel-shift a bundle of component wires by a hand operation or by using a machine tool for twisting component wires by turning slowly a disc holding a drum of the component wires while taking out the component wires.

In the latter case using the machine tool, the stepping of the component wires is carried out for each pitch by pressing the component wires.

Referring to the drawings, the conventional stepping operation will be illustrated.

In the drawings, the same references designate identical or corresponding parts and a hatch for a sectional view is eliminated so as to be easily understood in certain drawings.

FIG. 1 shows a bundle of component wires treated by the rebel shifting and FIG. 1(a) is a sectional view perpendicular to the component wires and FIG. 1(b) is a sectional view parallel to the component wires. The reference numeral (100) designates a bundle of component wires which are arranged in two rows extending in a row direction and several lines extending in a line direction; (200) designates an insulator between two rows and (300) designates an insulator for a shifted wire (hereinafter referring to a S-insulator). As shown in FIG. 1(b), the component wire of the bundle (100) is shifted from the lower row to the upper row and the other component wire is shifted from the upper row to the lower row (the latter is not shown in FIG. 1(b)). The shifting point of the adjacent component wire is departed for one pitch shown as P in FIG. 1(b). The component wire is also shifted in the lines at the shifting point for the row whereby the component wires of the bundle are alternatively shifted.

In order to prepare such structure of the bundle of component wires by a hand operation, it is necessary to carry out the stepping of the component wires first.

FIG. 2 is a side view of a part of the stepped component wires. The stepped height W is equal to the sum of the width of the component wire and an insulator (200) between the rows and the distance between the shifting points of the adjacent component wires is one pitch P which is usually 50 mm to 100 mm.

When number of the lines of the component wires is N and, the stepped-bending of the component wires is carried out the component wire shifted is returned to the original condition at the distance departed for NP from the shifted point. Thus, the shaped component wires for one row are disposed on a table so that the edges are upper and the central parts are lower. The edge of the component wire which has the longest non-contacting portions, is lifted up and is crossed over the other bent component wires and is put on the opposite side. Then, the adjacent component wire is moved in the same manner in sequence. After finishing edges of the component wires in one side, the edges of the component wires in the other side are moved in the same manner from the longest non-contacted component wire in sequence.

In the operation, the non-contacted parts which should be lifted are sometimes about 4 m and the component wires are thin and easily bent. Accordingly, sometimes, it is necessary to lift up the component wire by three to four persons. The hand operation is simple but requires the labour work by many persons.

The other component wires in the other row are combined in the same manner. The former grouped component wires are turned over to cover on the latter grouped component wires and the edges of non-contacted parts of the latter grouped component wires are shifted on the contacted portion of the component wires. The other edges of the grouped component wires are also shifted in the same manner. The insulator between the rows (200) is inserted after the shifting operation. The hand operation is quite complicated as described. Moreover, in the operation, it is necessary to treat the component wires by stepped bending. The component wires for each row are previously combined and then, the two grouped component wires for two rows are further combined. Accordingly, it is evident for a hand operation that the rebel shifting can be attained only for a simple half coil prepared by carrying out the stepped combination for straight portions of the component wires and then bending the coil ends to curve them. Thus, the curved bundle of component wires or the bundle of component wires whose one ends are fixed such as one turn full coil or the coil ends could not be treated by the rebel shifting.

The half coil is prepared by cutting off both of noses of the diamond coil.

The one turn full coil is prepared by cutting off one end of the nose of the diamond coil. The rebel shifting is performed in the slot part.

The coil end means the part having relatively slight curve from the straight part of the slot part to the nose part.

The conventional machine disposing many drums of the component wires on a disc table has been used for a small number of the component wires in one bundle.

When the number of the component wires are 40 to 150 as a stator coil of a rotary machine, the number of the drums of the component wires is great. Accordingly, such machine has not been used in the field of coils of rotary machines.

The disadvantages of the conventional methods are as follows.

(a) it is operation requiring many steps and greater labour costs (b) the stepped combination could be attained only for straight component wires; and (c) it is necessary to combine an insulator between rows.

The operation for inserting the insulator for shifted wire (6) is carried out after the stepping operation. That is, the component wires are bent and shifted, a spatula having a thin edge of a width of 10 mm and a thickness of 5 mm is inserted into a gap under the component wire

(10) which has been bent and shifted and an insulator for shifted wire (6) having a predetermined size is inserted into the space. The insulator for shifted wire (6) is a sheet having a thickness of 0.1 to 0.2 mm on which mica is bonded.

It takes about 10 seconds to shift one part and accordingly, it takes about 30 to 60 minutes for one coil.

Thus, the stepped combination is a simple work but it requires a long labour time and many persons to be low productivity, disadvantageously.

SUMMARY OF THE INVENTION

It is an object of the present invention to overcome the above-mentioned disadvantages and to provide an apparatus for automatically carrying out the stepped combination without a hand operation to improve the productivity and to reduce the labour work.

It is another object of the present invention to provide an apparatus which overcomes a complicated hand operation and provides advantages that rebel shiftings can be applied to a coil end or a straight part of a one turn full coil because the bendings of component wires for fixing one end or one part of a bundle of component wires can be applied before a stepped combination.

It is the other object of the present invention to provide an apparatus for continuously preparing U-shaped bundle of component wire by a shuttle winding in rebel shifting for a one turn full coil.

It is the other object of the present invention to prevent assembly during or after a stepped combination since an insulator between rows and a thin pipe for cooling can be arranged before the stepped combination.

In accordance with the apparatus of the present invention, a wide floor area is not required and the rebel shifting and the insertion of an insulator for shifted wire can be easily attained for a short time by a simple apparatus.

BRIEF DESCRIPTION OF THE DRAWINGS

FIG. 1(a) is a sectional view perpendicular to the component wires and FIG. 1(b) is a sectional view parallel to the component wires;

FIGS. 4, 5, 6, 7, 8 and 9 respectively show the operations according to the present invention; and FIGS. 4(a), 6(a) and 7(a) are respectively front views thereof; and FIGS. 4(b), (c) FIGS. 5(a), (b), FIGS. 6(b), (c), FIGS. 7(b), (c) and FIGS. 8(a), (b) are respectively side views thereof; and FIG. 9 is a plan view;

FIGS. 18(a), (b) are a side view and a front view of an apparatus for clamping insulators under a shifted wire;

FIG. 19(a), (b), (c) are respectively a plan view, a side view and a front view for showing a transferring device for transferring a bundle of component wires and a knife device for cutting a lower part of the insulator under a shifted wire;

FIG. 21 are sectional views for illustrating a component wire recycling device.

DETAILED DESCRIPTION OF THE PREFERRED EMBODIMENTS

Figure 1:
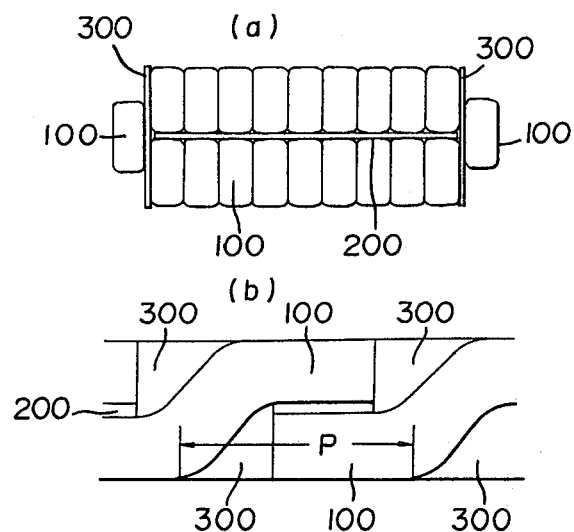
FIG. 1 shows a windings formed by a rebel shifting.
Figure 2:
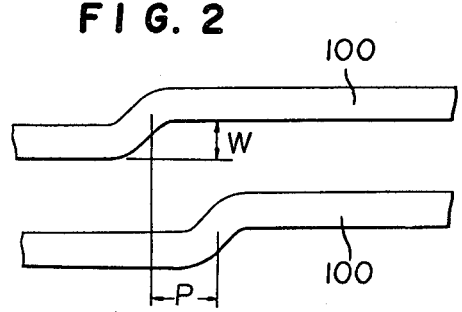
FIG. 2 is a side view of stepped component wires.
Figure 3:
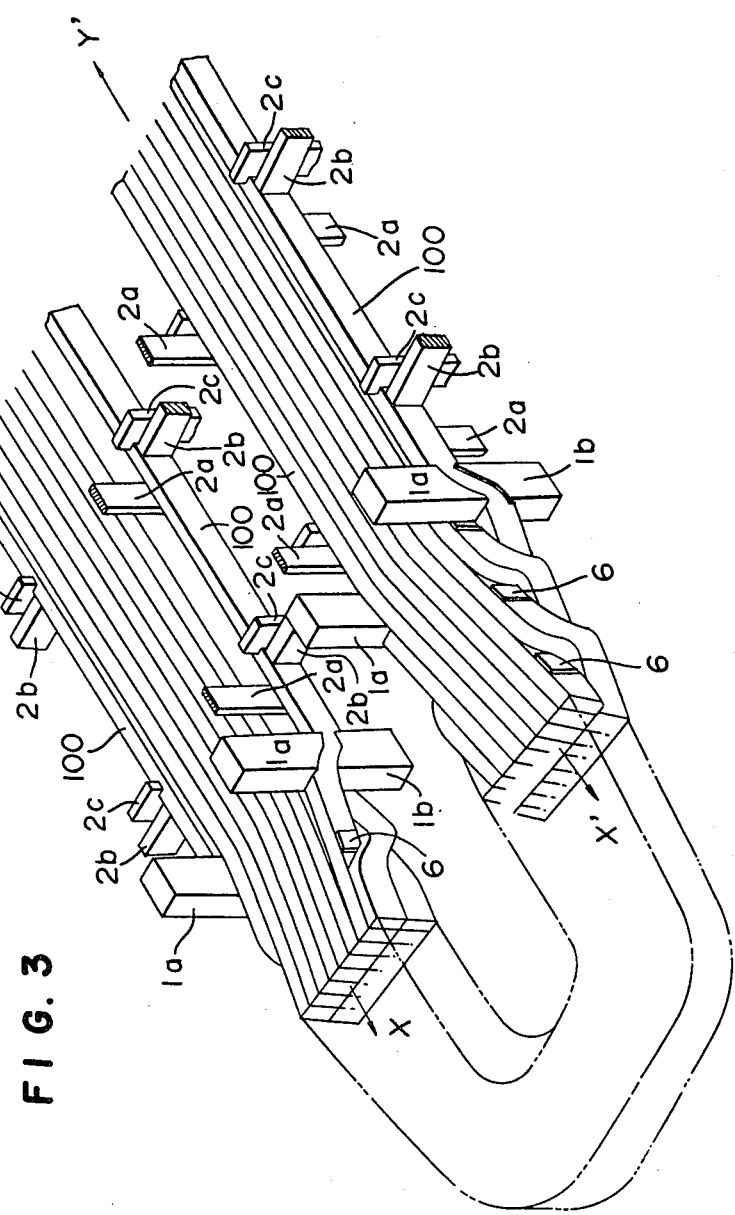
FIG. 3 is a schematic view of an important part of one embodiment of the apparatus of the present invention.

FIG. 3 is a schematic view of the important part of one embodiment of the apparatus of the present invention. In FIG. 3, the extended parts of the component wires (100) in the directions of X, X' and Y, Y' are not shown and can be a cut edge or the edges in X and X' directions can be connected through a nose. The shape of connecting the edges is called a one turn full coil shape.

In FIG. 3, the references (1a), (1b) form a component wire bending device. In the embodiment of FIG. 3, the bending device has a press mechanism having the upper mold (1a) and the lower mold (1b). The bending device can include other mechanisms such as a roller mechanism and a lever mechanism beside the press mechanism.

The reference (2a) designates a knife device for separating a component wire for stepped combination from the adjacent component wire; (2b) designates a push rod which pushes the component wires for stepped combination to shift one step; (2c) designates a hook device for changing the row of the component wire for stepped combination.

The apparatus of the present invention has a structure comprising a position shifting device and a drive controlling device (not shown) wherein the position shifting device fits and transfers the bundle of component wires (100) to a predetermined position depending upon the predetermined program and shifts the parts for stepped combination in sequence to the position shown in FIG. 3 and transfers the bundle of component wire (100) for one pitch P to X, X' direction after each stepped combination of said part, and carrying out the next stepped combination at the position departed for one pitch P; and the drive controlling device drives the knife device (2a), the push rod (2b), the hook device (2c) and the component wire bending device (1a, 1b) depending upon a predetermined program.

These devices are not shown in FIG. 3 since a design of these devices are well-known by a person skilled in the art. (One embodiment of these devices is shown in FIG. 19.)

The operation of the apparatus of the present invention will be illustrated.

For example, a preparation of the component wires in the first step in the case of a manufacture of a diamond coil, is carried out in the separate place, by a hand operation or a shuttle winding operation.

In the shuttle winding operation, a length of a spool is about ½ of the expanded wire of the diamond coil and a width of the spool is the same with the inner diameter of the nose of the coil and a width of the groove of the spool is two times of the width of the component wire. Two component wires are wound on the spool in parallel for number of turns corresponding to the required stepped combinations. Then, the spool is disassembled to remove the bundle of component wires and the bundle is bound by a string if necessary to prevent a break of the bundle. A center of the nose at one side is cut by a large clipper and the curved portions are straighten by a wooden hammer.

Usually, the rebel shifting is performed only at the slot part of the diamond coil and accordingly, each insulator (200) is inserted into each row at the slot parts. The insulator (200) can be a polyamide resin sheet (5 mils) such as Normex 411 (manufactured by DuPont).

Figure 8:
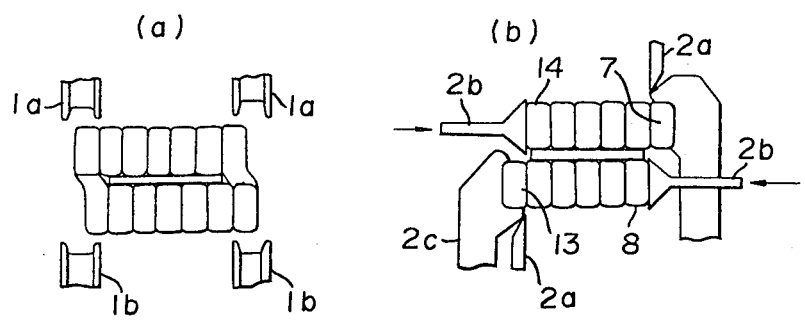
Figure 9:
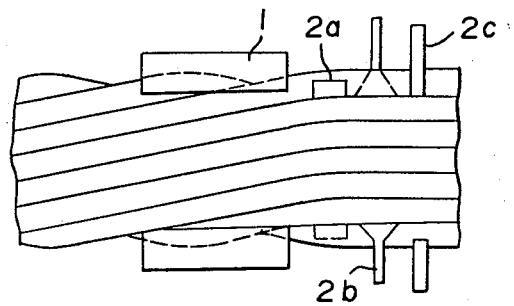

The operation of the apparatus of the present invention will be illustrated referring to FIGS. 4, 5, 6, 7, 8 and 9 wherein FIGS. 4(a), 6(a) and 7(a) are respectively front views; FIGS. 4(b), (c), 5(a), (b), 6(b), (c), 7(b), (c) and 8(a), (b) are respectively side views and FIG. 9 is a plan view.

In the step of transferring the bundle of the component wires (100), the relation of the component wires (100) and the devices (1a), (1b), (2a), (2b) and (2c) are shown in FIG. 4. FIG. 4(b) is a side view taken from the A-A' plane of FIG. 4(a) in the arrow direction; FIG. 4(c) is a side view taken from the B-B' plane of FIG. 4(a) in the arrow direction.

In FIG. 4(c), the reference numbers (3) to (14) are given for the component wires (100) and the stepped combination is given for the component wire (8) and the component wire (14). The component wire (8) is shifted to the lower row and the component wire (14) is shifted to the upper row. The shifting is carried out in the following order. The component wire is referred to as a wire. As shown in FIG. 5(a), the knife devices (2a) are respectively inserted between the wires (8), (7) and between the wires (14), (13) whereby the wires (8), (14) are free to shift and to be inserted between the press molds of the component wire bending device (1a), (1b) in a precise manner. At this time, the hook devices (2c) are pushed to the center by springs whereby the hook devices are outwardly shifted and prevent a falling of the wires (8), (14).

Then, the push rods (2b) are pulled as shown in FIG. 5(b). The bundle of the component wires (100) is held by the knife device (2a) to prevent breaking.

In the next step, the wires are pressed by the component wire bending device (1a,1b) to form a step as shown in FIGS. 6(a), (b) and simultaneously, the wires stepped by the pressing are respectively shifted (the wire (8) is downwardly shifted and the wire (14) is upwardly shifted).

In the returning step shown in FIGS. 7(a), (b), (c), the push rods (2b) are returned to push the wires (8), (14) while hook device (2c) are returned and the press molds (1a, 1b) are vertically returned and the knife devices (2a) are pulled out.

In the next step shown in FIGS. 8 and 9, the pushing force of the push rods (2b) is increased to push the wires (8), (14) into the row whereby the wires (13), (7) are pushed out. The stepped combination for one pitch is finished. The condition is now returned to the condition shown in FIGS. 4(a), (b), (c) except the wire (7) is shifted to the position of the wire (8) and the wire (13) is shifted to the position of the wire (14).

The bundle of the component wires (100) is transferred for one pitch and the next stepped combination is carried out.

As it is clearly understood by the above-mentioned description, it is unnecessary to form a stepped shape before the bounding of the component wires as the conventional method.

In the present invention, the bundle of component wires are previously prepared and one end of the bundle is fixed and then, the stepped combination can be carried out in sequence from the other end. Thus, the following preparation can be attained.

The conventional stepped combinations are applied on the straight part of a half coil, and then, the end of the straight part is bent and then, the stepped combinations of the coil end part are applied from the end of the straight part to the coil end in sequence by the apparatus of the present invention. Of course, the stepped combinations at the slot part as the half coil can be carried out in the straight part of the bundle of component wires.

Figure 10:
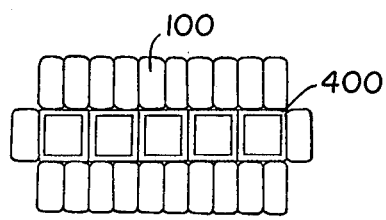
FIG. 10 is a sectional view of a thin metal tube for passing air.

In the embodiment of the present invention, the insulator is inserted between the rows of the wires. Thus, it is also possible to insert the insulator after the stepped combinations without inserting each step. In the case of a large size coil a, thin metal tube for air cooling is arranged in the row of the component wires and the stepped combinations are carried out, whereby the bundle of component wires incorporating the tube (400) in the rows shown in FIG. 10 can be obtained.

Figure 11:
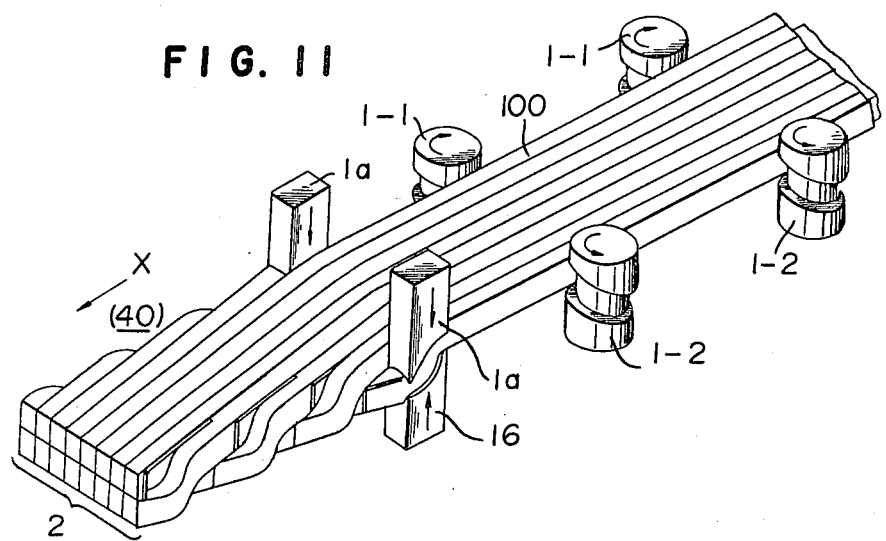
FIG. 11 is a schematic view of the other embodiment of the present invention.

In FIG. 11, the reference numerals (1-1), (1-2) designate rollers which are disposed as pairs at both sides of the bundle of component wires (30) of a formerly wound coil and in each interval of 30 to 50 cm in the longitudinal direction of the bundle (30). The reference numeral (2) designates a press type or lever type stepping mechanism for bending the wire (10) to form the stepped shape and (3) designates a transferring mechanism to transfer the bundle of component wires (100) to the arrow direction finishing each time finishing one step operation is finished, to the position under the stepping mechanism (2) for the next stepping operation. The stepped combination device is formed with the rollers (1-1), (1-2), the stepping mechanism (2) and the transferring mechanism (3).

Figure 12:
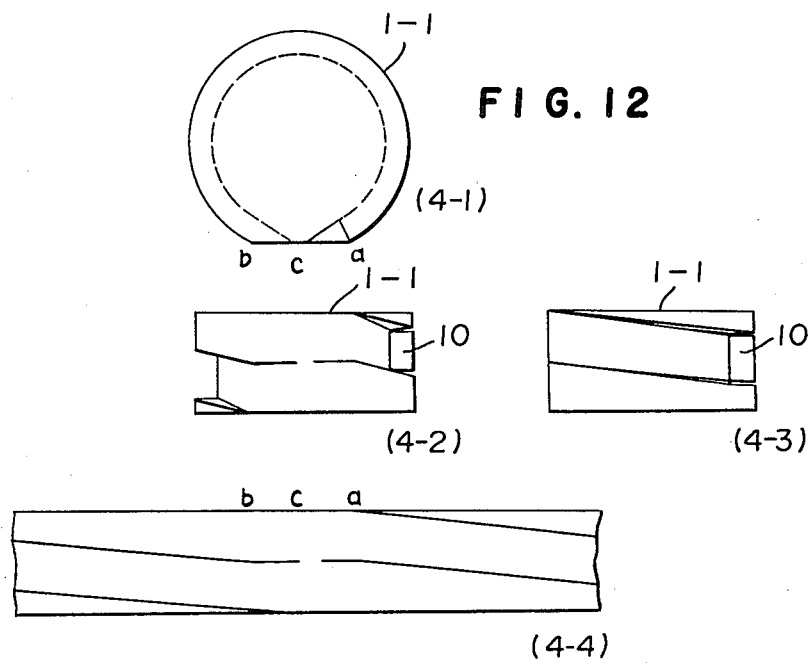
FIG. 12 shows detail of rollers.

The rollers (1-1), (1-2) will be illustrated in detail.
The rollers (1-1), (1-2) are the same as each other.
Referring to FIG. 12, the roller (1-1) is illustrated. FIG. 12 (4-1) is a plan view; (4-2) is a front view and (4-3) is a right side view; (4-4) is an expansion view for showing the shape of the surface of the roller (1-1).

On the surface of the roller (1-1), a groove having a width larger slightly than the width of one component wire (10) is formed so as to shift the component wire (10) for a length of the sectional view of the component wire (10) in the longitudinal direction during one turn of the roller (1-1) (between ⓐ to ⓑ in one turn). There is no groove in the Part ⓒ. The distance from the center of the roller (1-1) is an average of the distance from the center to the bottom of the groove and the distance from the center to the surface of the roller (1-1) having no groove (between ⓐ and ⓑ).

The groove is smoothly changed from ⓒ to ⓐ and ⓑ to ⓒ.

The rollers (1-1), (1-2)) having said structure are turned in the predetermined relation to the stepping mechanism (2) and the transferring mechanism (3).

The operation will be illustrated. The component wires are arranged in two rows between the rollers (1-1), (1-2) under the condition that the wires are contacted with the non-groove parts of the rollers (1-1), (1-2) (the part ⓒ in FIG. 12) and the stepped condition (5-1) in FIG. 13.

Figure 13:
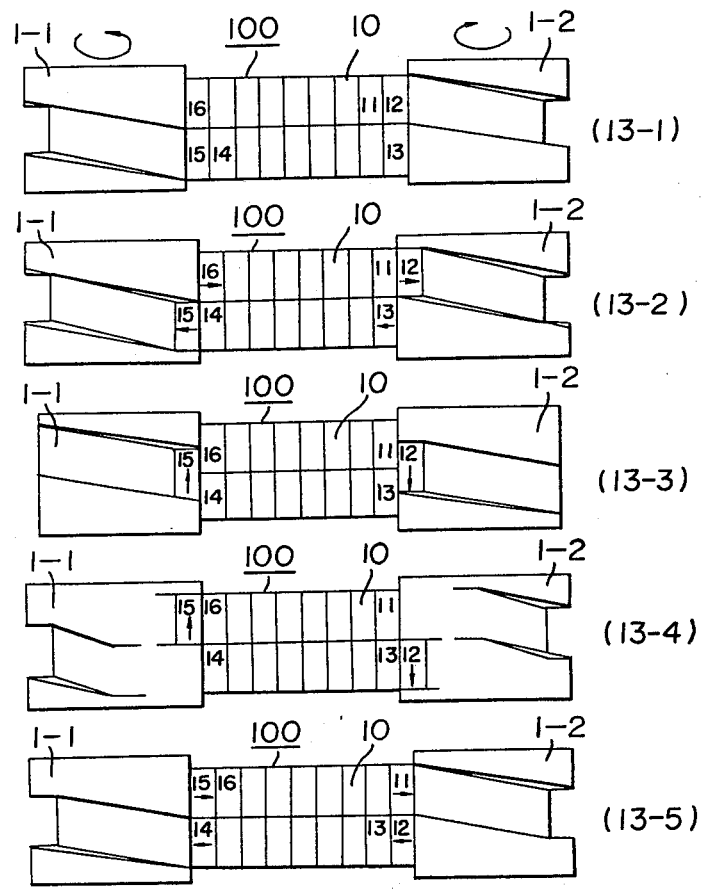
FIG. 13 shows steps for stepped combinations.

In the arrangement, the rollers (1-1), (1-2) are turned to the arrow direction shown in FIG. 13 (13-1), whereby the wires (10) in the upper row are shifted to right and the wire (10) in the lower row are shifted to left whereby each wire is put in each groove of the rollers (1-1), (1-2) as the step (5-2) of FIG. 13. Then, each wire in each groove is transferred by turning the rollers (1-1), (1-2). The wire (10) No. 12 in the right roller (1-2) of FIG. 13 is shifted downwardly whereas the wire (10) No. 15 in the left roller (1-1) is shifted upwardly. This corresponds to the steps (13-2), (13-3), (13-4) in FIG. 13.

The stepping mechanism is simultaneously operated together with the operation whereby the wires (10) No. 12 and No. 15 are bent and then, the transferring device (3) is operated to transfer the bundle of component wires (30) so as to conform the position for stepping to the stepping mechanism (2). Then, the wires are shifted and they are returned to the first step (13-1).

The operations are shown in Table 1 wherein the symbol * designates the structure shown in FIG. 11;  designates the position contacting the rollers with the component wires (the surface in FIG. 12); and * designates the step shown in FIG. 13.

TABLE 1

| | Functional part in operation (element) | | |
|---|---|---|---|
| Step | *Roller | *Stepping mech. | *Transferring mech. |
| 1. Shifting to step direction | o <br> ⓑ → ⓐ <br> ⓐ → ⓑ <br> *** (13-5) (13-1) (13-2) | ** | |
| 2. Shifting to row direction Stepped bending | o <br> ⓐ → ⓑ <br> ⓑ → ⓐ <br> *** (13-3) (13-4) | ** | o |
| 3. Transferring to wire direction | ** <br> ⓑ <br> ⓐ <br> *** (13-4) | | o |

Figure 14:
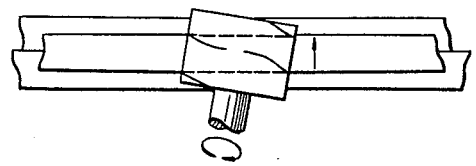
FIGS. 14 and 15 are respectively a side view and a plan view of the other embodiment of the present invention.

In the embodiment, the rollers (1-1), (1-2) are arranged so that the grooves are in a horizontal direction as shown in FIG. 14. Thus, the rollers can be arranged in slant. In this case, the grooves of the rollers (1-1), (1-2) are in parallel to the rows of the wires (10) whereby the insulation coating for the wires (10) is not damaged.

Figure 15:
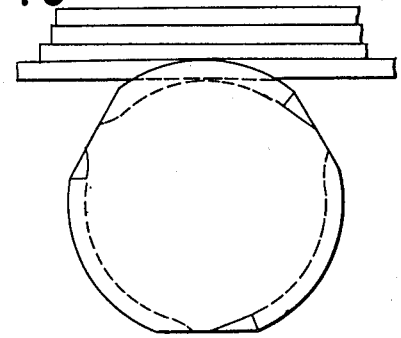

The rollers (1-1), (1-2) are not limited to ones having the function for one pitch in one turn and they can be ones having the function for one pitch in one of several turn as shown in FIG. 15.

Figure 16:
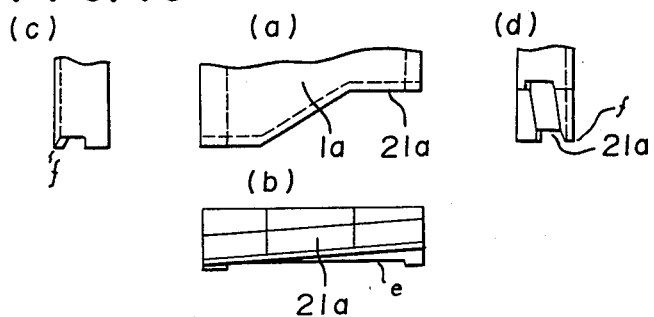
FIGS. 16 and 17 respectively show presses and dies used for bending in the present invention.
Figure 17:
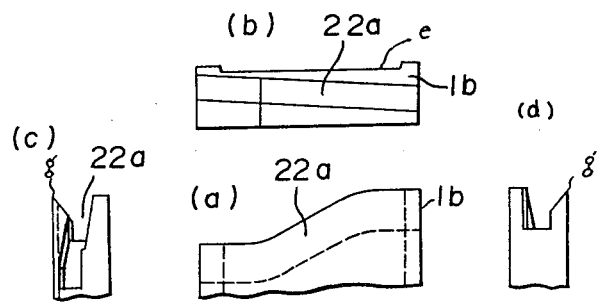

Referring to FIGS. 16 and 17, the die (21) and the press (22) of the stepping mechanism (20) for stepped-bending the wire (10) will be illustrated in detail.

Grooves (21a), (22a) are formed on the die (21) and the press (22) so as to carry out the stepped-bending of the wire (10) under the condition of contacting short sides of the wires in the sectional view.

The parts ⓕ, ⓖ are in the shape of knife edge and the part ⓔ is a groove having a depth of about 0.5 mm.

Referring to FIGS. 18(a), (b) as the side view and the front view, the insulator inserting device (30) which inserts an insulator (6) under a shifted wire (S-insulator) during the shifting step will be illustrated.

The S-insulator (6) is cut in suitable width and it is wound on a coiler (31). Rollers (32) intermittently turn to transfer the S-insulator (6) to the arrow direction and a guide (33) leads the S-insulator (6) to a predetermined position.

Referring to FIGS. 19(a), (b), (c), a transferring device (40) for transferring the bundle of component wires (100) for one pitch and the knife device (50) for cutting the lower part of the S-insulator (6) will be illustrated.

The transferring device (40) is disposed on both sides of the bundle of component wires (100) and supporting rods (41) can be shifted in the transversal direction and a shoe (42) is connected on the supporting rods (41) by pins (43).

When the supporting rods are shifted to the right in FIG. 19, the shoe (42) is shifted to the arrow direction whereby the shoe (42) slides on the bundle of component wires (100). Thus, when the rods are shifted to left, the shoe (42) is crotched to the bundle of component wires (100) by applying the force to the reverse direction to the arrow direction in the relation of the pin (43) whereby the bundle of component wires (100) is shifted to left.

The knife device (50) is disposed at both sides of the lower surface of the bundle of component wires (100) and the knife device (50) is mounted on the rods (41) and is shifted with the rods (41) in the transversal direction.

The knife edge is disposed so as to contact with the part of the S-insulator (6) contacting with the bundle of component wires (100) whereby the S-insulator (6) is cut during the shifting step when the knife device is shifted to right.

Figure 20:
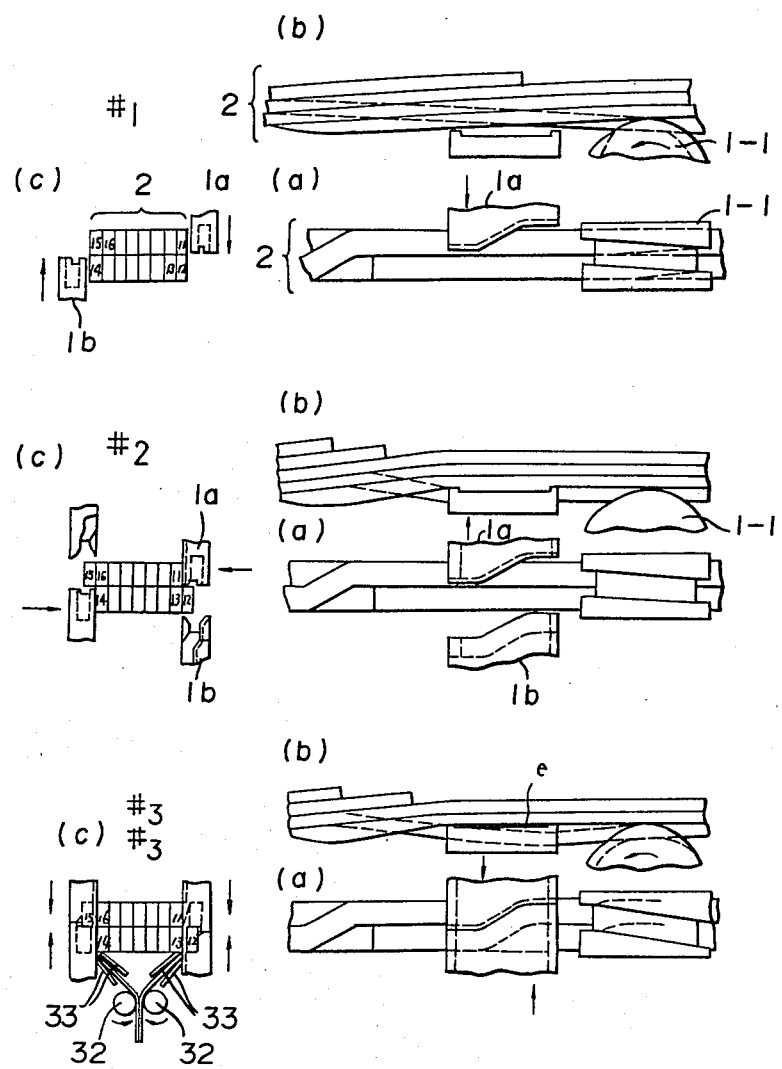
FIGS. 20(a), (b) are sectional views and side views for illustrating steps given by the apparatus of the present invention.

The total operation will be further illustrated wherein the operations of the mechanisms are illustrated referring to FIGS. 20 (A), (B) and the relation of rollers (1-1), (1-2) and the wire (10) of the bundle of component wire (100) at the roller part will be illustrated referring to FIG. 21.

In FIGS. 20 and 21, the symbols #1 to #6 designate step numbers. In FIGS. 20 (A), (B), the figures (a) are front views and the figures (b) are plan views and the figures (c) are sectional views in the steps.

FIGS. 21 are sectional views of the bundle of component wires (100) showing the relations of the wire (10) and the rollers (1-1), (1-2).

In FIGS. 20 and 21, the positions of the wires (10) are defined by numbers of the wires.

The steps will be illustrated.

The wires (10) are arranged in two rows and the S-insulator (6) is inserted between the rows before insulating the bundle of component wires on the apparatus.

The insulator (6) is a polyamide sheet (5 mil) and the width of the insulator is slightly narrower than the width of the bundle of component wires (100).

The rollers (1-1), (1-2) are turned to the position ⓐ of FIG. 12. In this condition, the wires (10) #11 and #14 are pushed by the rollers (1-1), (1-2) whereby the wires (10) #15 and #12 are respectively put in the grooves (21a), (22a) of the rollers. The dies (1a) fall near the middle part between the rows (Step I).

Then, the dies (1a) push the wires (10) #11 and #14 of the bundle of component wires (100) whereby the wires (10) #12 and #15 are respectively put out to the opposite sides (Step II).

Then, the rollers (1-1), (1-2) are turned to shift upwardly the wire #12 and to shift downwardly the wire #15. The grooves (21a), (22a) of the rollers (1-1), (1-2) have slightly deeper depth after the point ⓑ, whereby the wires (10) are vertically shiftable. The dies (1a) and the presses (1b) are shifted so as to nip the wires #12 and

15. The edges (f) and (g) of the presses (1b) and the dies (1a) are inserted into the boundaries of the wires to enlarge the gaps and the positions of the wires #12 and #15 are slightly shifted as shown in the plan view (b) (#3).

When the presses (1b) and the dies (1b) are pressed to finish the stepped-bending of the wires #12 and #15 to give desired shapes, the rollers (1-1), (1-2) are stopped at the position (c). (Step 3 I)

The rollers (32), (32) are turned to transfer the insulator (6) during the shifting and the S-insulator (6) is lead by the guide (33) to the gap between the wires #13, #14 and the presses (1b) and the dies (1a), that is the grooves (e) formed on the presses (1b) and the dies (1a). When the S-insulator (6) reaches to the upper part of the bundle of component wires (100), the rollers (32) (32) are stopped to stop the S-insulator (6). (Step II)

Then, the presses (1b) and the dies (1a) are turned to the original positions. (Step 4)

The rollers (1-1), (1-2) are turned to stop at the position (d). The wires (10) #12 and #15 at the rollers (1-1), (1-2) are put out from the grooves (21a), (22a). The wires (10) #13 and #16 are in the same level with the wires (10) #13 and #16 because the positions of the surfaces of the rollers (1-1), (1-2) are lower level. Thus, the wire (10) #12 and #15 is compressed to the direction of the bundle of component wires (100) whereby the S-insulator (6) inserted below the wires (10) #12 and #15 are firmly fixed. (Step 5 I)

Then, the knife device (50) is shifted in the transversal direction and the insulator (6) is cut at the projected position below the bundle of component wires (100). The transferring device (40) is moved to right and the shoe (42) moves to the arrow direction by the pin (43) whereby the bundle of component wires (100) is not moved. (Step 5 II)

Then, the transferring device (40) is moved to left and the shoe (42) is pressed to the direction of the wire (10) by the pin (43) whereby the bundle of component wires (100) is moved to left. The movement is stopped at the position moved for one pitch. (Step 6)

The rollers (1-1), (1-2) are turned to the position (a) and the wires (10) #13 and #16 are put in the grooves (21a), (22a) of the rollers (1-1), (1-2).

The stepped combination for one pitch and the insulator inserting operation are completed.

In said embodiment, the bundle of component wires (100) is prepared by arranging the wires (10) while plying the wires. It is also possible to prepare the bundle of component wires (100) by the other methods. For example, a shuttle winding is prepared as the prepartion of a diamond coil and the nose at one end is cut to form U-shape and the bundle in U-shape is installed on the apparatus and the stepping of the straight parts of the bundle can be carried out by the method of the present invention. It is also possible to carry out the stepping of the straight part of the half coil (both noses of the diamond coil are cut) and then, to carry out the bending of the edge of the straight part and then, to carry out the stepping of the coil end (a middle part between a straight part and a nose part).

In said embodiment, the S-insulator (6) is fed from a roll. However, it is possible to cut the S-insulator (6) for each one length and to feed automatically each S-insulator (6) to the connecting point.

In said embodiment, the grooves for feeding the S-insulator are (6) at the rear side of the presses (1b) and the dies (1a). However, in order to feed the S-insulator (6) in precise manner, holes for passing the S-insulator (6) can be formed in the presses (1b) and the dies (1a). As the simple method, it is possible to form a space by departing the presses (1b) and the dies (1a) from the bundle of component wires (100) while clamping the wires (10) by the presses (1b) and the dies (1a).

In order to carry out the stepped-bending of the wires (10), the presses (1b) and the dies (1a) are used in said embodiment. However, it is possible to carry out the stepped-bending of the wires (10) by using levers. In said embodiment, the rollers (1-1), (1-2) having the slant grooves (21a), (22a) are used as the device for recycling the wires (10). However, it is possible to use the hooks, the push rods and the knife device.

In said embodiment, the insulator (6) is inserted just after the stepped-bending of the wires. However, it is possible to insert the S-insulator (6) by pushing a spatula between the wires (10) behind several pitches from the stepping mechanism to form each space.

These features are covered by the present invention since the untreated wires (10) of the bundle of component wires (100) are recycled in the stepped-bending operation for one pitch and the S-insulator (6) is inserted for each pitch.

What is claimed is:

1. A stepped combination apparatus which comprises:
    transferring means for moving a bundle of flat rectangular component wires arranged in plural rows and plural lines in the longitudinal direction;
    pushing means adapted to contact one side of said bundle for pushing component wires in the line direction so as to offset a component wire at the opposite side;
    shifting means for shifting the offset component wire to another row;
    stepped-bending means for step-bending the component wire which is offset;
    a knife device for separating the component wire treating by step-bending and the adjacent wire;
    rollers, each having a groove on the peripheral surface, each said groove having a width for fitting a component wire, said groove being formed in a slant direction so as to move the wire for the width of said groove in a predetermined direction as the wire is passed in said groove defined in the surface of said rollers during each turn thereof, each of said rollers having a inlet portion connected to each of said grooves, each of said inlets being parallel to the circumference of the roller.

2. An apparatus according to claim 1 wherein each said inlet portion is overlapped with another inlet portion for an adjacent slanted groove and has a length sufficient to receive the wire.

3. An apparatus according to claim 1 wherein the depth of each said groove is adapted to receive the wire and said depth is gradually reduced toward said inlet portion so as to smoothly connect with another inlet portion for an adjacent slanted groove at the central portion of said roller.

4. An apparatus according to claim 1 wherein the bottom of the inlet portion is plane or convex so as to have a certain length.

* * * * *